(12) United States Patent
Kobayashi et al.

(10) Patent No.: US 10,326,132 B2
(45) Date of Patent: *Jun. 18, 2019

(54) METHOD OF PRODUCING POSITIVE ELECTRODE ACTIVE MATERIAL FOR NONAQUEOUS ELECTROLYTE SECONDARY BATTERY

(71) Applicant: Nichia Corporation, Anan-shi, Tokushima (JP)

(72) Inventors: Kenichi Kobayashi, Tokushima (JP); Yukiko Sano, Anan (JP)

(73) Assignee: NICHIA CORPORATION, Anan-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,976

(22) Filed: Sep. 25, 2018

(65) Prior Publication Data

US 2019/0027749 A1    Jan. 24, 2019

Related U.S. Application Data

(62) Division of application No. 15/473,974, filed on Mar. 30, 2017, now Pat. No. 10,115,967.

(30) Foreign Application Priority Data

Mar. 31, 2016   (JP) .................................. 2016-072487
Mar. 24, 2017   (JP) .................................. 2017-059653

(51) Int. Cl.
*C01G 53/00* (2006.01)
*H01M 4/131* (2010.01)
(Continued)

(52) U.S. Cl.
CPC .......... *H01M 4/505* (2013.01); *C01G 53/006* (2013.01); *C01G 53/40* (2013.01); *C01G 53/42* (2013.01);
(Continued)

(58) Field of Classification Search
CPC ..................................................... C01G 53/50
See application file for complete search history.

(56) References Cited

U.S. PATENT DOCUMENTS

| | | |
|---|---|---|
| 2004/0110063 A1 | 6/2004 | Uchitomi et al. |
| 2014/0308584 A1 | 10/2014 | Endo |
| 2016/0254536 A1 | 9/2016 | Hiratsuka |

FOREIGN PATENT DOCUMENTS

| | | |
|---|---|---|
| JP | 2001-243949 A | 9/2001 |
| JP | 2003-221236 A | 8/2003 |

(Continued)

*Primary Examiner* — Peter F Godenschwager
(74) *Attorney, Agent, or Firm* — Birch, Stewart, Kolasch & Birch LLP

(57) ABSTRACT

A method of producing a positive electrode active material for a nonaqueous electrolyte secondary battery, the method includes preparing nickel-containing composite oxide particles having a ratio $^1D_{90}/^1D_{10}$ of a 90% particle size $^1D_{90}$ to a 10% particle size $^1D_{10}$ in volume-based cumulative particle size distribution is 3 or less; mixing the composite oxide particles and a lithium compound to obtain a first mixture; subjecting the first mixture to a first heat treatment at a first temperature and a second heat treatment at a second temperature higher than the first temperature to obtain a first heat-treated product; and subjecting the first heat-treated material to a dispersion treatment.

13 Claims, 4 Drawing Sheets

2.50 μm

(51) Int. Cl.
  *H01M 4/485*    (2010.01)
  *H01M 4/505*    (2010.01)
  *H01M 4/525*    (2010.01)
  *H01M 10/052*   (2010.01)
  *H01M 4/1391*   (2010.01)
  *H01M 10/0525*  (2010.01)

(52) U.S. Cl.
  CPC ............ *C01G 53/50* (2013.01); *H01M 4/131* (2013.01); *H01M 4/1391* (2013.01); *H01M 4/485* (2013.01); *H01M 4/525* (2013.01); *H01M 10/0525* (2013.01); *C01P 2004/03* (2013.01); *C01P 2004/51* (2013.01); *C01P 2004/61* (2013.01); *C01P 2006/40* (2013.01); *H01M 10/052* (2013.01)

(56) References Cited

FOREIGN PATENT DOCUMENTS

| | | |
|---|---|---|
| JP | 2004-355824 A | 12/2004 |
| JP | 2013-201077 A | 10/2013 |
| JP | 2014-063669 A | 4/2014 |
| JP | 2015-056382 A | 3/2015 |
| JP | 2016-164869 A | 9/2016 |
| WO | WO 2013/069454 A1 | 5/2013 |

2.50 μm 2.50 μm 2.50 μm 2.50 μm 2.56 μm 2.50 μm 2.50 μm

METHOD OF PRODUCING POSITIVE ELECTRODE ACTIVE MATERIAL FOR NONAQUEOUS ELECTROLYTE SECONDARY BATTERY

CROSS-REFERENCE TO RELATED APPLICATIONS

This application is a Divisional of copending U.S. application Ser. No. 15/473,974, filed on Mar. 30, 2017, which claims the benefit under 35 U.S.C. § 119(a) to Japanese Patent Application No. 2016-072487, filed on Mar. 31, 2016, and Japanese Patent Application No. 2017-059653, filed on Mar. 24, 2017, the disclosures of which are hereby incorporated by reference in their entirety.

BACKGROUND

Field of the Invention

The present disclosure relates to a method of producing a positive electrode active material for a nonaqueous electrolyte secondary battery.

Description of Related Art

A positive electrode active material for a nonaqueous electrolyte secondary battery for application to large-sized power machines, such as electric vehicles, is required to have high output characteristics and high durability. In order to obtain high output characteristics, in a positive electrode active material having a structure in which a large number of primary particles are aggregated to form a secondary particles, it is effective, for example, to have a hollow structure in each secondary particle to increase the BET specific surface area, and to reduce the size of aggregated primary particles of each secondary particle. However, in such a positive electrode active material, one or more cracks may occur in the secondary particles due to pressurization in the formation of an electrode, expansion/shrinkage upon charge and discharge, etc., and there has been room for improvement in durability.

In relation to the above problems, a positive electrode active material containing lithium-transition metal oxide particles composed of a single particle or composed of a reduced number of primary particles forming each secondary particle and a method of producing the same are proposed, in which a lithium-transition metal composite oxide including aggregated secondary particles is ground to adjust the particle size of secondary particles, and the lithium-transition metal composite oxide after the particle size adjustment is subjected to another heat treatment (see, e.g., JP 2001-243949 A).

SUMMARY

A method of producing a positive electrode active material for a nonaqueous electrolyte secondary battery, the method includes preparing nickel-containing composite oxide particles having a ratio $^1D_{90}/^1D_{10}$ of a 90% particle size $^1D_{90}$ to a 10% particle size $^1D_{10}$ in volume-based cumulative particle size distribution of 3 or less; mixing the composite oxide particles and a lithium compound to obtain a first mixture; subjecting the first mixture to a first heat treatment at a first temperature and a second heat treatment at a second temperature higher than the first temperature to obtain a first heat-treated material; and subjecting the first heat-treated material to a dispersion treatment. The positive electrode active material includes lithium-transition metal composite oxide particles has a ratio $^2D_{50}/^2D_{SEM}$ of a 50% particle size $^2D_{50}$ in volume-based cumulative particle size distribution to an average particle size $^2D_{SEM}$ based on electron microscopic observation in a range of 1 to 4. The lithium-transition metal composite oxide particles have a composition represented by the following formula (1):

$$Li_pNi_xCo_yM^1_zO_{2+\alpha} \quad (1)$$

In formula, $1.0 \leq p \leq 1.3$, $0.3 \leq x < 0.6$, $0 \leq y \leq 0.4$, $0 \leq z \leq 0.5$, $x+y+z=1$, and $-0.1 \leq \alpha \leq 0.1$, and $M^1$ represents at least one of Mn and Al.

DETAILED DESCRIPTION

Figure 1:
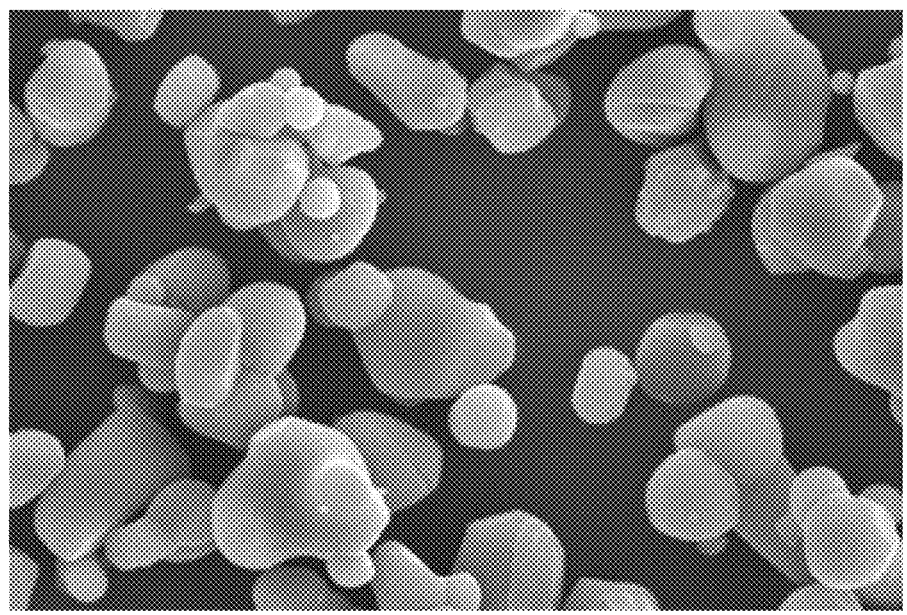
FIG. 1 shows an example of an SEM image of lithium-transition metal composite oxide particles in Example 1.

The present invention resides in an efficient method of producing a positive electrode active material containing lithium-transition metal oxide particles composed of a single particle or composed of a reduced number of primary particles forming each secondary particle.

The invention is described in detail as follows, and includes the aspects shown below.

A method of producing a positive electrode active material for a nonaqueous electrolyte secondary battery includes: preparing nickel-containing composite oxide particles having a ratio $^1D_{90}/^1D_{10}$ of a 90% particle size $^1D_{90}$ to a 10% particle size $^1D_{10}$ in volume-based cumulative particle size distribution of 3 or less; mixing the composite oxide particles and a lithium compound to obtain a first mixture; subjecting the first mixture to a first heat treatment at a first temperature and a second heat treatment at a second temperature higher than the first temperature to obtain a first heat-treated material; and subjecting the first heat-treated material to a dispersion treatment. The positive electrode active material includes lithium-transition metal composite oxide particles having a ratio $^2D_{50}/^2D_{SEM}$ of a 50% particle size $^2D_{50}$ in volume-based cumulative particle size distribution to an average particle size $^2D_{SEM}$ based on electron microscopic observation in a range of 1 to 4. The lithium-transition metal composite oxide particles have a composition represented by the following formula (I):

$$Li_pNi_xCo_yM^1_zO_{2+\alpha} \quad (1)$$

in formula (1), $1.0 \leq p \leq 1.3$, $0.3 \leq x < 0.6$, $0 \leq y \leq 0.4$, $0 \leq z \leq 0.5$, $x+y+z=1$, and $-0.1 \leq \alpha \leq 0.1$, and $M^1$ represents at least one of Mn and Al.

According to one embodiment of the present disclosure, an efficient production method for obtaining a positive electrode active material containing lithium-transition metal oxide particles composed of a single particle or composed of a reduced number of primary particles forming each secondary particle, can be provided.

A method of producing a positive electrode active material for a nonaqueous electrolyte secondary battery according the present disclosure will be described below based on embodiments Hereinafter, a method for producing a positive electrode active material for a nonaqueous electrolyte secondary battery according the present disclosure will be described based on embodiments. Embodiments in the below are intended to embody the technical concept of the present invention, and the scope of the present invention is not limited thereto. In the present specification, the content of each component in a composition refers to, in the case where a plurality of substances corresponding to such a component are present in the composition, refers to the total amount of the plurality of substances present in the composition unless otherwise specified.

Method for Producing Positive Electrode Active Material for Nonaqueous Electrolyte Secondary Battery A method for producing a positive electrode active material for a nonaqueous electrolyte secondary battery, the method includes preparing nickel-containing composite oxide particles (hereinafter sometimes referred to as "first composite oxide particles") having a ratio $^1D_{90}/^1D_{10}$ of a 90% particle size $^1D_{90}$ to a 10% particle size $^1D_{10}$ in volume-based cumulative particle size distribution of 3 or less; mixing the composite oxide particles and a lithium compound to obtain a first mixture; subjecting the first mixture to a first heat treatment at a first temperature and a second heat treatment at a second temperature higher than the first temperature to obtain a first heat-treated material; and subjecting the first heat-treated material to a dispersion treatment. The obtained positive electrode active material includes lithium-transition metal composite oxide particles that have a ratio $^2D_{50}/^2D_{SEM}$ of a 50% particle size $^2D_{50}$ in volume-based cumulative particle size distribution to an average particle size $^2D_{SEM}$ based on electron microscopic observation in a range of 1 to 4. The lithium-transition metal composite oxide has a composition represented by the following formula (1):

$$Li_pNi_xCo_yM^1_zO_{2+\alpha} \qquad (1)$$

In formula (1), $1.0 \le p \le 1.3$, $0.3 \le x < 0.6$, $0 \le y \le 0.4$, $0 \le z \le 0.5$, $x+y+=1$, and $-0.1 \le \alpha \le 0.1$, and $M^1$ represents at least one of Mn and Al.

The first composite oxide particles having a uniform particle size having $^1D_{90}/^1D_{10}$ of 3 or less are used as a raw material, and the particles are heat-treated together with a lithium compound, followed by performing a dispersion treatment instead of a grinding treatment, lithium-transition metal composite oxide particles that are made of a single primary particle or a secondary particle composed of a small number of primary particles (hereinafter both may be simply referred to as "a single particle") are efficiently produced. In a conventional method of producing a positive electrode active material including simple particles, the particle size is adjusted by grinding, with which control of the particle size distribution may be difficult, and it may be particularly difficult to obtain a sharp particle size distribution with a uniform particle size.

The first composite oxide particles for use in the method of producing a positive electrode active material contains at least nickel, and it is preferable that nickel and at least one element selected from the group consisting of cobalt, manganese, and aluminum be contained, and it is more preferable that nickel, cobalt, and at least one of manganese and aluminum be contained.

In the first composite oxide particles, $^1D_{90}/^1D_{10}$ is 3 or less, and preferably 2 or less. In the first composite oxide particles, the 50% particle size $^1D_{50}$ in volume-based cumulative particle size distribution is 12 μm or less, for example, preferably 6 μm or less, and more preferably 4 μm or less, and is 1 μm or more, for example, and preferably 2 μm or more.

In the case where the first composite oxide particles contain nickel, cobalt, and at least one of manganese and aluminum, the content ratio Ni/Co/(Mn+Al) of nickel, cobalt, and manganese+aluminum may be 1/1/1 or 1/1/(0.5/0.5) on a molar basis, for example.

The first composite oxide particles may be prepared by suitable selection from commercially available products, or may also be prepared by producing particles having desired characteristics. In the case where the first composite oxide particles are produced, for example, the first composite oxide particles by subjecting a composite hydroxide containing desired metal elements to a heat treatment. The composite hydroxide may be produced by a coprecipitation method, in which a raw material compound soluble in a solvent is dissolved in the solvent, and the temperature is controlled, the pH is adjusted, or a complexing agent is added, for example, to obtain a composite hydroxide according to the intended composition. For the details of the method for obtaining a composite oxide by a coprecipitation method, JP 2003-292322 A, JP 2011-116580 A, and the like (the disclosures of which are incorporated herein by reference in their entirety) may be referred to.

The prepared first composite oxide particles are mixed with a lithium compound to prepare a first mixture. Examples of lithium compounds include lithium hydroxide, lithium carbonate, and lithium oxide.

The particle size of the lithium compound used is, as the 50% particle size in volume-based cumulative particle size distribution, in a range of 0.1 μm to 100 μm, for example, preferably 2 μm to 20 μm.

In the first mixture, the ratio of the total number of moles of lithium to the total number of moles of metal elements forming the first composite oxide particles is in a range of 1 to 1.3, for example, preferably 1 to 1.25.

The first composite oxide particles and a lithium compound may be mixed using a high-speed shear mixer or the like.

The obtained first mixture is subjected to a first heat treatment at a first temperature and then to a second heat treatment at a second temperature higher than the first temperature, so that a first heat-treated material is obtained. Performing heat-treatment of the first mixture in two stages, that is, a first heat treatment at a relatively low temperature and a second heat treatment at a relatively high temperature, allows for, for example, in the first heat treatment, proceeding the reaction between the lithium compound and the first composite oxide can proceed sufficiently to reduce the residual lithium compound at a temperature in a region where conversion into simple particles does not occur, and in the second heat treatment, growing particles grow while suppressing the sintering of particles due to action of the residual lithium compound as a flux.

In the heat treatment of the first mixture, for example, the first mixture is heated from room temperature to the first temperature and heat-treated at the first temperature for a predetermined period of time, then heated to the second temperature and heat-treated at the second temperature for a predetermined period of time, and cooled to room temperature, for example; as a result, a first heat-treated material is obtained. The first heat-treated material should have been heat-treated at two or more temperatures, and may further be subjected to an additional heat treatment after the second heat treatment at a temperature higher than the second temperature.

The first temperature is in a range of 850° C. to 950° C. or less, for example, preferably 900° C. to 940° C. Meanwhile, the second temperature is in a range of 980° C. to 1,100° C., for example, preferably 1,000° C. to 1,080° C. Further, the difference between the first temperature and the second temperature is 30° C. or more, for example, preferably 100° C. or more, and is 250° C. or less, for example, preferably 180° C. or less.

The duration of the first heat treatment is, for example, in a range of 1 hour to 20 hours, preferably 5 hours to 10 hours. The duration of the second heat treatment is, for example, in a range of 1 hour to 20 hours, for example, preferably 5 hours to 10 hours. The duration of the first heat treatment and the duration of the second heat treatment may be the same or different. In the case where they are different, for example, the duration of the second heat treatment may be longer than the duration of the first heat treatment. More specifically, for example, the duration of the second heat treatment may be 1.05 to 2 times, preferably 1.1 to 1.5 times, longer than the heat treatment time of the first heat treatment. The first heat treatment and the second heat treatment may be successively performed, or may be each independently performed. In the case where the first heat treatment and the second heat treatment are successively performed, the heating rate from the first temperature to the second temperature may be 5° C./min, for example.

The heat treatment may be performed in the air or an oxygen atmosphere. Further, the heat treatment may be performed, for example, using a box furnace, a rotary kiln, a pusher furnace, a roller hearth kiln, or the like.

The first heat-treated material is subjected to a dispersion treatment. Dissociation of the sintered primary particles not by a grinding treatment, which is accompanied by strong shear force or impact, but by a dispersion treatment, the resulting lithium-transition metal composite oxide particles have a narrow particle size distribution and a uniform particle size. The dispersion treatment may be performed in a dry condition or a wet condition, and is preferably performed in a dry condition. The dispersion treatment can be performed, for example, using a ball mill, a jet mill, or the like. The conditions for the dispersion treatment may be set, for example, so that the $^2D_{50}/^2D_{SEM}$ of the lithium-transition metal composite oxide particles after the dispersion treatment is in a desired range, for example, in a range of 1 to 4.

For example, in the case where the dispersion treatment is performed using a ball mill, resin media may be used. Examples of materials for the resin media include a urethane resin and a nylon resin. Generally, alumina, zirconia, or the like is used for the material of the media for a ball mill, and particles are ground with such media. In contrast, using resin media allows for dissociating sintered primary particles without the particles being ground. The size of the resin media may be in a range of φ5 mm to 30 mm, for example. Further, for the body (shell), a urethane resin, a nylon resin, or the like may be used, for example. The time of the dispersion treatment is in a range of 3 minutes to 60 minutes, for example, preferably in a range of 10 minutes to 30 minutes. For the conditions for the dispersion treatment using a ball mill, the amount of media, the speed of rotation or vibration, the dispersion time, the specific gravity of medium, and the like can be adjusted in accordance with the value of $^1D_{90}/^1D_{10}$, etc., of the first composite oxide particles serving as a raw material so as to achieve the desired value of $^2D_{50}/^2D_{SEM}$.

For example, in the case where the dispersion treatment is preformed using a jet mill, the feed pressure, the grinding pressure, the feed speed, and the like can be adjusted depending on the $^1D_{90}/^1D_{10}$, etc., of the first composite oxide particles serving as a raw material so as to achieve the desired $^2D_{50}/^2D_{SEM}$ without the primary particles being ground. The feed pressure may be in a range of 0.1 MPa to 0.5 MPa, for example, and the grinding pressure may be in a range of 0.1 MPa to 0.6 MPa, for example.

Through the production method described above, a positive electrode active material containing lithium-transition metal composite oxide particles in the form of simple particles can be efficiently produced.

Certain embodiments of the production method may further include: mixing the dispersion-treated first heat-treated material and a lithium compound to obtain a second mixture; and subjecting the obtained second mixture to a heat treatment to obtain a second heat-treated material. By adding the lithium compound a plurality of times to obtain a mixture in each time and heat-treating each of the obtained mixtures, lithium-transition metal composite oxide particles having a narrower particle size distribution and a more uniform particle size tend to be obtained. The first heat-treated material contains a lithium-transition metal composite oxide, for example.

The details of the lithium compound in the second mixture are as described above. The lithium compound contained in the second mixture may be a single kind or a combination of two or more kinds, and may be the same as or different from the lithium compound in the first mixture.

In the second mixture, the ratio of the total number of moles of lithium to the total number of moles of metal elements other than lithium forming the first heat-treated material is in a range of 1.0 to 1.3, for example, preferably in a range of 1.08 to 1.22. In the case where the lithium compound is added in a plurality of times, in the first mixture, the ratio of the total number of moles of lithium to the total number of moles of metal elements contained in the first composite oxide is in a range of 0.75 to 1.27, for example, preferably in a range of 0.9 to 1.07.

The first heat-treated material and the lithium compound can be mixed using a high-speed shear mixer or the like, for example.

The obtained second mixture is subjected to a heat treatment to obtain a second heat-treated material containing lithium-transition metal composite oxide particles. The temperature of the heat treatment is 650° C. or more, for example, preferably 800° C. or more, and is 970° C. or less, for example, preferably 950° C. or less. The heat treatment may be performed at a single temperature, or may also be performed at a plurality of temperatures.

The heat treatment time of the second mixture is in a range of 1 hour to 20 hours, for example, preferably in a range of 5 hours to 15 hours. The heat treatment of the second mixture may be performed in air or an oxygen atmosphere.

The heat-treated second heat-treated material may be subjected to a dispersion treatment as necessary, and the details thereof are as described above. Lithium-transition metal composite oxide particles obtained by heat-treating and dispersion-treating the second mixture have a narrower particle size distribution, and is a positive electrode active material having improved output characteristics and durability.

The lithium-transition metal composite oxide particles obtained by the production method described above have a composition represented by formula (1) and has the ratio $^2D_{50}/^2D_{SEM}$ of the 50% particle size $^2D_{50}$ in volume-based cumulative particle size distribution to the average particle size $^2D_{SEM}$ based on electron microscopic observation in a range of 1 to 4. Further, it is preferable that the ratio $^2D_{90}/^2D_{10}$ of the 90% particle size $^2D_{90}$ to the 10% particle size $^2D_{10}$ in volume-based cumulative particle size distribution be 4 or less.

$^2D_{50}/^2D_{SEM}$ in a range of 1 to 4 indicates that the lithium-transition metal composite oxide particles are a single particle or particles composed of a small number of primary particles and have reduced contact grain boundaries between primary particles. In addition, $^2D_{90}/^2D_{10}$ of 4 or less indicates that the lithium-transition metal composite oxide particles have a narrow distribution width in volume-based cumulative particle size, and the particle size is uniform. A positive electrode active material containing lithium-transition metal composite oxide particles and having such configurations are expected to achieve both excellent output characteristics and excellent durability.

As compared with a positive electrode active material containing lithium-transition metal composite oxide particles having secondary particles made of a large number of aggregated primary particles, in a conventional positive electrode active material containing lithium-transition metal composite oxide particles, which are single particles, a decrease in capacity retention ratio due to the disconnection of the electrical conduction path of lithium ions caused by the grain boundary dissociation of secondary particles during a charge/discharge cycle is prevented, and also an increase in the diffusion/migration resistance of lithium ions is prevented. Accordingly, good durability is exhibited. Meanwhile, in such a conventional positive electrode active material, a three-dimensional grain boundary network as in a positive electrode active material made of aggregated particles is hardly formed, and a high-power design utilizing grain boundary conduction is difficult to achieve. Therefore, there has been a tendency that the output characteristics are insufficient. It is believed that output power characteristics can be increased by decreasing the particle size ($^2D_{SEM}$) of single particles. However, in the case where the particle size is too small, the interaction between particles is increased, so that the electrode plate filling properties tend to be greatly deteriorated. Further, decrease in powder fluidity may the handling ability may greatly deteriorate. Meanwhile, in particular, for obtaining a practical energy density, a certain degree of the particle size is needed. However, it is believed that an increase in particle size tends to result in a greater lack of output power.

The lithium-transition metal composite oxide particles according to one embodiment of the present disclosure have more uniform particle size than that of conventional single particles. With this configuration, even in the case where the battery is charged and discharged at a high current density, variations in charge/discharge depth among particles due to current concentration on some particles can be reduced. Accordingly, it is believed that, while preventing increase in resistance due to current concentration, local degradation through charge/discharge cycles can be reduced.

Further, with uniform particle size of lithium-transition metal composite oxide particles having reduced grain boundaries, the particles do not collapse even when pressed at a high pressure in the manufacturing of an electrode. Accordingly, the space between particles is considered to be homogenized. In addition, in the case where a battery is formed, the space between particles is filled with an electrolyte to serve as a lithium ion diffusion path. With uniform size of such a diffusion path, variations in amount of charge/discharge among particles can be reduced. Accordingly, it is considered that, even lithium-transition metal composite oxide particles having reduced contact grain boundaries between primary particles can achieve good output power characteristics while ensuring electrode plate filling performance.

Further, generally, in the case where single particles are synthesized, heat treatment is needed to be performed under high temperature for growth of particles. In particular, in a composition having a high Ni proportion, when calcination is performed at a high temperature, the element Ni may be incorporated into the Li site, that is, so-called disorder may occur. Disorder inhibits the diffusion of Li ions in composite oxide particles and causes resistance, resulting in effects such as a decrease in charge/discharge capacity at a practical current density, a decrease in output characteristics, etc. Therefore, it is preferable that such disorder be suppressed. Suppressing disorder allows for further improving the capacity and output power characteristics in single particles.

In the lithium-transition metal composite oxide particles forming the positive electrode active material, the average particle size $^2D_{SEM}$ based on electron microscopic observation is in a range of 1 μm to 7 μm in view of durability. In view of output characteristics and the electrode plate filling properties, the average particle size $^2D_{SEM}$ is preferably 1.5 μm or more, and is preferably 5.5 μm or less, and more preferably 3 μm or less.

The average particle size $^2D_{SEM}$ based on electron microscopic observation is determined as follows. Using a scanning electron microscope (SEM), observation is performed at a magnification of 1,000 to 10,000 in accordance with the particle size. One hundred particles having recognizable profiles are selected, and the equivalent spherical diameters of the selected particles are calculated using an image processing software. The arithmetic average of the obtained equivalent spherical diameters is determined as $^2D_{SEM}$.

In the case where $^2D_{50}/^2D_{SEM}$ is 1, the lithium-transition metal composite oxide particles are single particles. In the case where $^2D_{50}/^2D_{SEM}$ is closer to 1, the lithium-transition metal composite oxide particles are made of small number of primary particles. In view of durability, it is preferable that $^2D_{50}/^2D_{SEM}$ be in a range of 1 to 4. In view of power output density, it is preferable that $^2D_{50}/^2D_{SEM}$ be 3 or less, particularly preferably 2.5 or less.

Further, the 50% particle size $^2D_{50}$ of the lithium-transition metal composite oxide particles is, for example, 1 μm or more, and preferably 1.5 μm or more. The 50% particle size $^2D_{50}$ is, for example, 21 μm or less, preferably 5.5 μm or less, and more preferably 3 μm or less.

The 50% particle size $^2D_{50}$ is determined as a particle size corresponding to a cumulative percentage of 50% from the smaller particle size side in the volume-based cumulative particle size distribution measured under wet conditions using a laser diffraction particle size distribution analyzer. Similarly, the 90% particle size $^2D_{90}$ and 10% particle size $^2D_{10}$ described below are determined as particle sizes corresponding to cumulative percentages of 90% and 10%, respectively, from the smaller particle size side.

In the lithium-transition metal composite oxide particles, the ratio $^2D_{90}/^2D_{10}$ of 90% particle size $^2D_{90}$ to 10% particle size $^2D_{10}$ in volume-based cumulative particle size distribution is, for example, 4 or less, preferably 3 or less, and more preferably 2.5 or less in view of output characteristics.

The lithium-transition metal composite oxide constituting the lithium-transition metal composite oxide particles has a composition represented by the above formula (1). Further, it is preferable that the lithium-transition metal composite oxide have a layered structure. Examples of lithium-transition metal composite oxides having a composition represented by formula (1) and having a layered structure include lithium-nickel composite oxides and lithium-nickel-cobalt-manganese composite oxides.

In formula (1), in terms of output characteristics, it is preferable that p satisfy $1.1 \leq p \leq 1.2$. In view of productivity, it is preferable that x satisfy $0.3 \leq x < 0.5$. In view of material cost, it is preferable that y satisfy $0 < y \leq 0.33$, and in view of charge/discharge capacity and output characteristics, it is preferable that z satisfy $0 < z \leq 0.4$. In addition, it is preferable that x:z is 3:1 to 1:1, and more preferably 2:1 to 1:1.

In the positive electrode active material, the lithium-transition metal composite oxide particles obtained in the method of producing as described above may be doped with an element other than the elements forming the lithium-transition metal composite oxide. Examples of an element for doping include B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi. Examples of compounds used for doping with these elements include oxides and fluorides containing at least one element selected from the group consisting of these elements, and Li composite oxides thereof. The amount of doping may be, for example, in a range of 0.005 mol % to 10 mol % with respect to the lithium-transition metal composite oxide particles, for example.

In the positive electrode active material, the lithium-transition metal composite oxide particles obtained in the method of producing as described above may include core particles containing a lithium-transition metal composite oxide and a deposit disposed on the core particle surface. The deposit should be disposed on at least a portion of the core particle surface, and is preferably disposed in a region of 1% or more of the surface area of the core particles. The composition of the deposit is suitably selected in accordance with the purpose and the like, and examples thereof include oxides and fluorides containing at least one kind selected from the group consisting of B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi, as well as Li-composite oxides thereof. The content of deposit may be, for example, may be in a range of 0.03 mass % to 10 mass %, preferably 0.1 mass % to 2 mass %, of the lithium-transition metal composite oxide particles.

In the lithium-transition metal composite oxide, in view of the initial efficiency in a nonaqueous electrolyte secondary battery, the disorder of nickel element determined by X-ray diffractometry is preferably 4.0% or less, more preferably 2.0% or less, and still more preferably 1.5% or less. The expression "disorder of nickel element" in the present specification refers to chemical disorder of nickel ions generated in a site of transition metal ions. In a lithium-transition metal composite oxide having a layered structure, such a disorder is typically an exchange between lithium ions that occupies the site represented by 3b when expressed in the Wyckoff symbol (i.e., 3b site, the same applies hereinafter) and transition metal ions that occupies the 3a site. The smaller disorder of nickel element is, the more initial efficiency is improved, and thus is more preferable.

When applied to a positive electrode of a nonaqueous electrolyte secondary battery, a positive electrode active material produced by the method of producing according to one embodiment of the present disclosure can provide a nonaqueous electrolyte secondary battery that can achieve both good output characteristics and good durability. A positive electrode active material can be contained in a positive electrode active material layer disposed on a current collector to constitute a positive electrode. That is, the present invention further includes: an electrode for a nonaqueous electrolyte secondary battery that includes a positive electrode active material produced by the production method described above; and a nonaqueous electrolyte secondary battery including the electrode.

Electrode for Nonaqueous Electrolyte Secondary Battery

An electrode for a nonaqueous electrolyte secondary battery includes a current collector and a positive electrode active material layer that is disposed on the current collector and contains the positive electrode active material for a nonaqueous electrolyte secondary battery described above. A nonaqueous electrolyte secondary battery including such an electrode can achieve both high durability and high output characteristics.

Examples of materials for the current collector include aluminum, nickel, and stainless steel. The positive electrode active material layer can be formed as below. A positive electrode mixture obtained by mixing the above positive electrode active material, an electrically conductive material, a binder, and the like with a solvent is applied onto a current collector, followed by a drying treatment, a pressurization treatment, and the like. Examples of electrically conductive materials include natural graphite, artificial graphite, and acetylene black. Examples of binders include polyvinylidene fluoride, polytetrafluoroethylene, and polyamide acrylic resin.

Nonaqueous Electrolyte Secondary Battery

A nonaqueous electrolyte secondary battery includes the electrode for a nonaqueous electrolyte secondary battery described above. In addition to the electrode for a nonaqueous electrolyte secondary battery, the nonaqueous electrolyte secondary battery further includes a negative electrode for a nonaqueous secondary battery, a nonaqueous electrolyte, a separator, and the like. As the negative electrode, nonaqueous electrolyte, separator, and the like in the nonaqueous electrolyte secondary battery, those for a nonaqueous electrolyte secondary battery described in JP 2002-075367 A, JP 2011-146390 A, JP 2006-12433 A, and the like (the disclosures of which are incorporated herein by reference in their entirety) may be suitably used, for example.

EXAMPLES

Examples of the present invention will be described below in detail.

First, methods of measuring physical properties in examples and comparative examples in the below will be described.

The value of $^1D_{10}$ and $^2D_{10}$, $^1D_{50}$ and $^2D_{50}$, and $^1D_{90}$ and $^2D_{90}$ were determined by, with use of a laser diffraction particle size distribution analyzer (SALD-3100 manufactured by Shimadzu Corporation), measuring volume-based cumulative particle size distribution, and calculating the value of each of $^1D_{10}$ and $^2D_{10}$, $^1D_{50}$ and $^2D_{50}$, and $^1D_{90}$ and $^2D_{90}$ corresponding to the respective cumulative percentages from the smaller particle size side were determined.

The average particle size $^1D_{SEM}$ and $^2D_{SEM}$ based on electron microscopic observation was determined as follows. In an image observed at a magnification of 1,000 to 10,000 using a scanning electron microscope (SEM), 100 particles having recognizable outlines were selected, and the equivalent spherical diameters of the selected particles were calculated using an image processing software (Image J). The arithmetic average of the obtained equivalent spherical diameters was determined as $D_{SEM}$.

The value of elemental nickel disorder (amount of Ni disorder) was determined by X-ray diffractometry as below. The X-ray diffraction spectrum of obtained lithium-transition metal composite oxide particles was measured using a CuKα ray under conditions of a tube current of 40 mA and a tube voltage of 40 kV. With the composition model being expressed as $Li_{1-d}Ni_dMeO_2$ (wherein Me is transition metals other than nickel in the lithium-transition metal composite oxide), based on the obtained X-ray diffraction spectrum, the structure of the lithium-transition metal composite oxide particles was optimized by Rietveld analysis using RIETAN-2000 software. The percentage of d calculated as a result of structural optimization was determined as the amount of Ni disorder.

Example 1

Seed Formation Step

First, 10 kg of water was charged in a reaction tank, an aqueous ammonia solution was added into water while stirring water, and the ammonium ion concentration was adjusted to 1.8 mass %. The temperature in the tank was set at 25° C., and a nitrogen gas was circulated in the tank to maintain the oxygen concentration of the inner space of the reaction tank at 10 vol % or less. A 25 mass % aqueous sodium hydroxide solution was added to water in the reaction tank, and the pH value of the solution in the tank was adjusted to 13.5 or more. Next, a nickel sulfate solution, a cobalt sulfate solution, and a manganese sulfate solution were mixed to prepare a mixed aqueous solution having a molar ratio of 1:1:1. The mixed aqueous solution was added to the solution in the reaction tank until the solute content reached 4 mol, and, while controlling the pH value of the reaction solution at 12.0 or more with a sodium hydroxide solution, seed formation was performed.

Crystallization Step

After the seed formation step, the temperature in the tank was maintained at 25° C. or more until the completion of the crystallization step. In addition, a mixed aqueous solution having a solute content of 1,200 mol was prepared and added to the reaction tank simultaneously with an aqueous ammonia solution while maintaining the ammonium ion concentration in the solution at 2,000 ppm or more over 5 hours or more so that no additional seed formation would take place in the reaction tank. During the reaction, the pH value of the reaction solution was controlled to be maintained in a range of 10.5 to 12.0 with a sodium hydroxide solution. Sampling was successively performed during the reaction, and the addition was completed when the $D_{50}$ of the composite hydroxide particles reached about 4.5 μm.

Next, the product was washed with water, filtered, and dried, so that composite hydroxide particles are obtained. The obtained hydroxide precursor was subjected to a heat treatment at 300° C. for 20 hours in the ambient atmosphere, thereby obtaining a composite oxide having the following properties: composition ratio Ni/Co/Mn=0.33/0.33/0.33, $^1D_{10}$=3.4 μm, $^1D_{50}$=4.5 μm, $^1D_{90}$=6.0 μm, $^1D_{90}/^1D_{10}$=1.8.

Synthesis Step

The obtained composite oxide and lithium carbonate were mixed such that Li/(Ni+Co+Mn) satisfies 1.15 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment once using a jet mill in which the feed pressure was adjusted to 0.2 MPa and the grinding pressure was adjusted to 0.1 MPa so that the primary particles is prevented from being ground, and then dry-sieved to obtain a powder.

As a result, lithium-transition metal composite oxide particles represented by the composition formula: $Li_{1.15}Ni_{0.33}Co_{0.33}Mn_{0.33}O_2$ and having the following properties were obtained: average particle size $^2D_{SEM}$ based on electron microscopic observation: 2.8 μm, $^2D_{10}$=2.9 μm, $^2D_{50}$=5.0 μm, $^2D_{90}$=7.9 μm, ratio $D_{50}/^2D_{SEM}$ of $^2D_{90}$ to average particle size $^2D_{SEM}$: 1.8, ratio $^2D_{90}/^2D_{10}$ in particle size distribution: 2.7, amount of Ni disorder: 0.6%. The physical property values of the obtained lithium-transition metal composite oxide particles are shown in Table 1, and an SEM image thereof is shown in FIG. 1.

Example 2

Under the same conditions as in Example 1 except that the timing of the completion of addition of a mixed aqueous solution in the crystallization step was changed to the time where the value of $D_{50}$ of composite hydroxide particles reached about 3.0 μm, first composite oxide particles having the following properties was obtained: composition ratio Ni/Co/Mn=0.33/0.33/0.33, $^1D_{10}$=2.2 μm, $^1D_{50}$=3.0 μm, $^1D_{90}$=4.1 μm, $^1D_{90}/^1D_{10}$=1.9. The obtained first composite oxide particles and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 30 minutes, and then dry-sieved to obtain a powder. The obtained powder and lithium carbonate were mixed so that Li/(Ni+Co+Mn) becomes 1.17 and calcined in air at 700° C. for 10 hours to obtain a sintered body. The obtained sintered body was crushed, subjected to a dispersion treatment in a ball mill made of resin for 30 minutes, and then dry-sieved to obtain a powder.

As a result, lithium-transition metal composite oxide particles represented by the composition formula: $Li_{1.17}Ni_{0.33}Co_{0.33}Mn_{0.33}O_2$ and having the following properties were obtained: average particle size $^2D_{SEM}$: 1.2 μm, $^2D_{10}$=1.4 μm, $^2D_{50}$=3.2 μm, $^2D_{90}$=5.1 μm, ratio $^2D_{50}/^2D_{SEM}$ of $^2D_{50}$ to average particle size $^2D_{SEM}$: 2.7, ratio $^2D_{90}/^2D_{10}$ in particle size distribution: 3.6, amount of Ni disorder: 1.7%. The physical property values of the obtained lithium-transition metal composite oxide particles are shown in Table 1.

Example 3

First composite oxide particles were obtained under the same conditions as in Example 2. The obtained first composite oxide particles and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 30 minutes, and then dry-sieved to obtain a powder. The obtained powder and lithium carbonate were mixed at Li/(Ni+Co+Mn)=1.17 and calcined in air at 900° C. for 10 hours to obtain a sintered body. The obtained sintered body was crushed, subjected to a dispersion treatment in a ball mill made of resin for 30 minutes, and then dry-sieved to obtain a powder.

Figure 2:
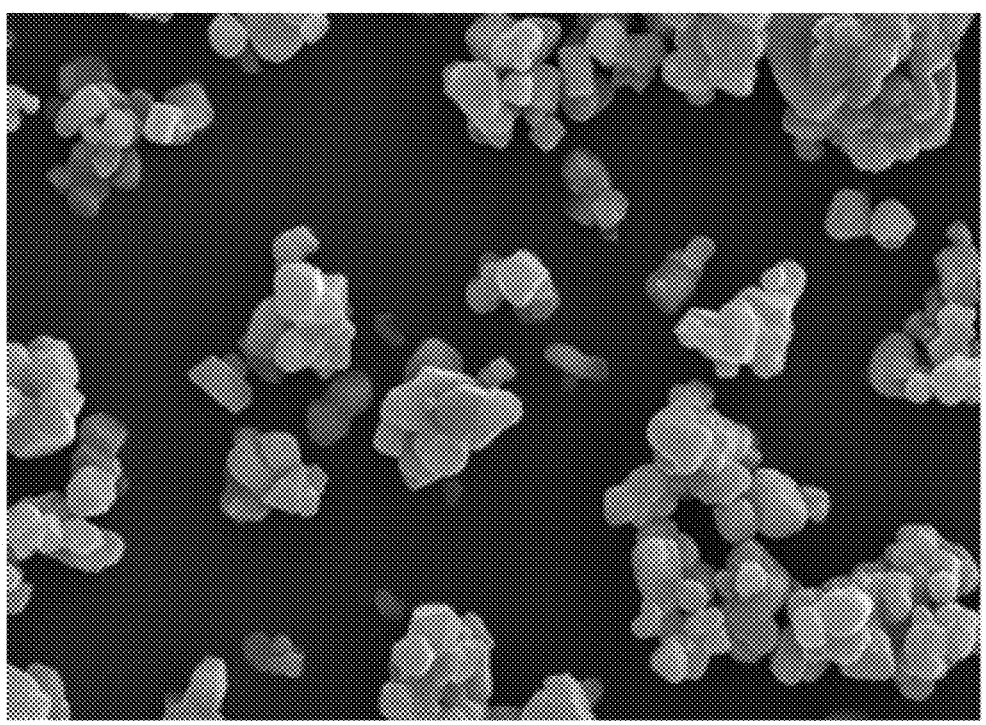
FIG. 2 shows an example of an SEM image of lithium-transition metal composite oxide particles in Example 3.

As a result, lithium-transition metal composite oxide particles represented by the composition formula: $Li_{1.17}Ni_{0.33}Co_{0.33}Mn_{0.33}O_2$ and having the following properties were obtained: average particle size $^2D_{SEM}$: 1.2 μm, $^2D_{10}$=1.5 μm, $^2D_{50}$=3.3 μm, $^2D_{90}$=5.1 μm, ratio $^2D_{50}/^2D_{SEM}$ of $^2D_{50}$ to average particle size $^2D_{SEM}$: 2.8, ratio $^2D_{90}/^2D_{10}$ in particle size distribution: 3.4, amount of Ni disorder: 0.9%. The physical property values of the obtained lithium-transition metal composite oxide particles are shown in Table 1, and an SEM image thereof is shown in FIG. 2.

Example 4

First composite oxide particles were obtained under the same conditions as in Example 2. The obtained first composite oxide particles and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 30 minutes, and then dry-sieved to obtain a powder. The obtained powder and lithium carbonate were mixed so that Li/(Ni+Co+Mn) becomes 1.17 and calcined in air at 900° C. for 10 hours to obtain a sintered body. The obtained sintered body was crushed, subjected to a dispersion treatment twice using a jet mill with the feed pressure adjusted to 0.4 MPa and the grinding pressure adjusted to 0.55 MPa so as to prevent the primary particles from being ground, and then dry-sieved to obtain a powder.

Figure 3:
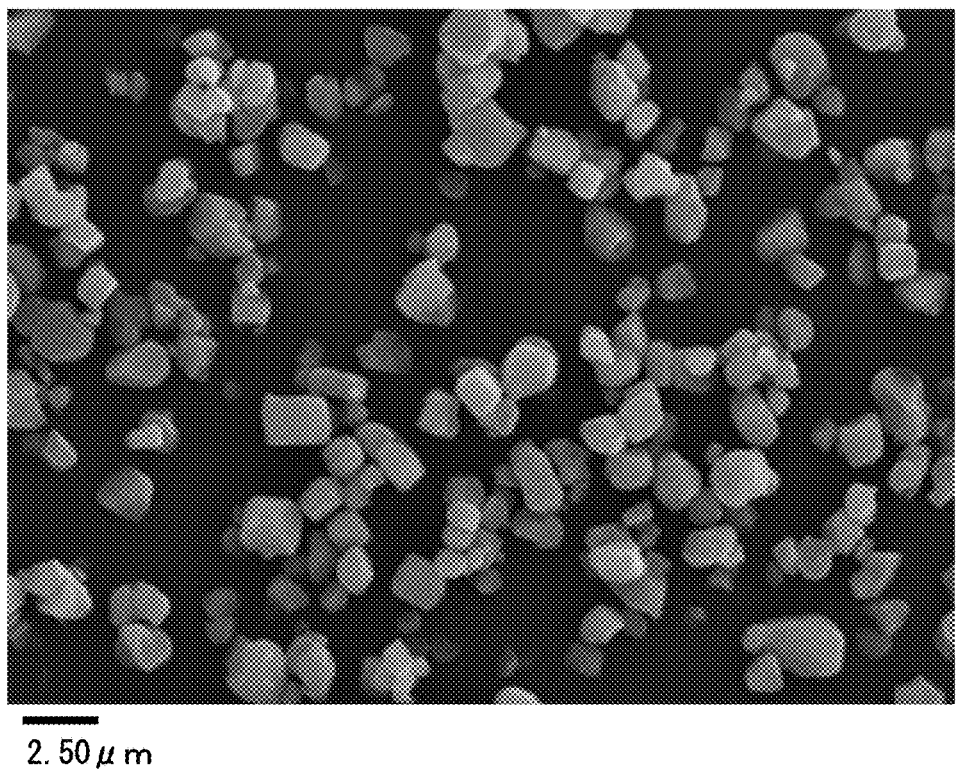
FIG. 3 shows an example of an SEM image of lithium-transition metal composite oxide particles in Example 4.

As a result, lithium-transition metal composite oxide particles represented by the composition formula: $Li_{1.17}Ni_{0.33}Co_{0.33}Mn_{0.33}O_2$ and having the following properties were obtained: average particle size $^2D_{SEM}$: 1.4 μm, $^2D_{10}$=1.1 μm, $^2D_{50}$=1.9 μm, $^2D_{90}$=2.8 μm, ratio $^2D_{50}/^2D_{SEM}$ of $^2D_{50}$ to average particle size $^2D_{SEM}$: 1.4, ratio $^2D_{90}/^2D_{10}$ in particle size distribution: 2.5, amount of Ni disorder: 1.0%. The physical property values of the obtained lithium-transition metal composite oxide particles are shown in Table 1, and an SEM image thereof is shown in FIG. 3.

Example 5

Under the same conditions as in Example 1 except that the timing of the completion of addition of a mixed aqueous solution in the crystallization step was changed to the time where the $D_{50}$ of composite hydroxide particles reached 9.9 μm, first composite oxide particles having the following properties were obtained: composition ratio Ni/Co/Mn=0.33/0.33/0.33, $^1D_{10}$=8.6 μm, $^1D_{50}$=9.9 μm, $^1D_{90}$=12.7 μm, $^1D_{90}/^1D_{10}$=1.5. The obtained first composite oxide particles and lithium carbonate were mixed so that Li/(Ni+Co+Mn) becomes 1.05 to obtain a raw material mixture. The obtained raw material mixture was calcined in air at 925° C. for 7.5 hours and then calcined at 1,080° C. for 6 hours to obtain a sintered body. The obtained sintered body was crushed, subjected to a dispersion treatment in a ball mill made of resin for 10 minutes, and then dry-sieved to obtain a powder. The obtained powder and lithium carbonate were mixed so that Li/(Ni+Co+Mn) becomes 1.14 and calcined in air at 900° C. for 10 hours to obtain sintered body. The obtained sintered body was crushed, subjected to a dispersion treatment in a ball mill made of resin for 10 minutes, and then dry-sieved to obtain a powder.

Figure 4:
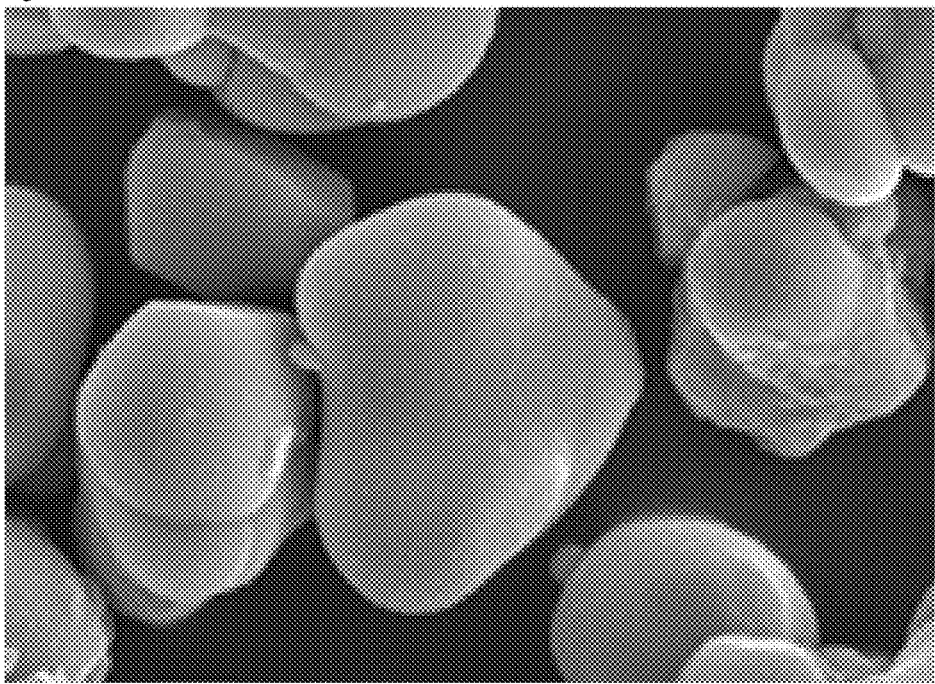
FIG. 4 shows an example of an SEM image of lithium-transition metal composite oxide particles in Example 5.

As a result, lithium-transition metal composite oxide particles represented by the composition formula: $Li_{1.14}Ni_{0.33}Co_{0.33}Mn_{0.33}O_2$ and having the following properties were obtained: average particle size $^2D_{SEM}$: 6.8 μm, $^2D_{10}$=7.6 μm, $^2D_{50}$=10.4 μm, $^2D_{90}$=16.4 μm, ratio $^2D_{50}/^2D_{SEM}$ of $^2D_{50}$ to average particle size $^2D_{SEM}$: 1.5, ratio $^2D_{90}/^2D_{10}$ in particle size distribution: 2.2, amount of Ni disorder: 1.1%. The physical property values of the obtained lithium-transition metal composite oxide particles are shown in Table 1, and an SEM image thereof is shown in FIG. 4.

Example 6

First composite oxide particles were obtained under the same conditions as in Example 2. The obtained first composite oxide particles and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 10 minutes, and then dry-sieved to obtain a powder. The obtained powder and lithium carbonate were mixed so that Li/(Ni+Co+Mn) becomes 1.14 and calcined in air at 900° C. for 10 hours to obtain a sintered body. The obtained sintered body was crushed, subjected to a dispersion treatment in a ball mill made of resin for 10 minutes, and then dry-sieved to obtain a powder.

Figure 5:
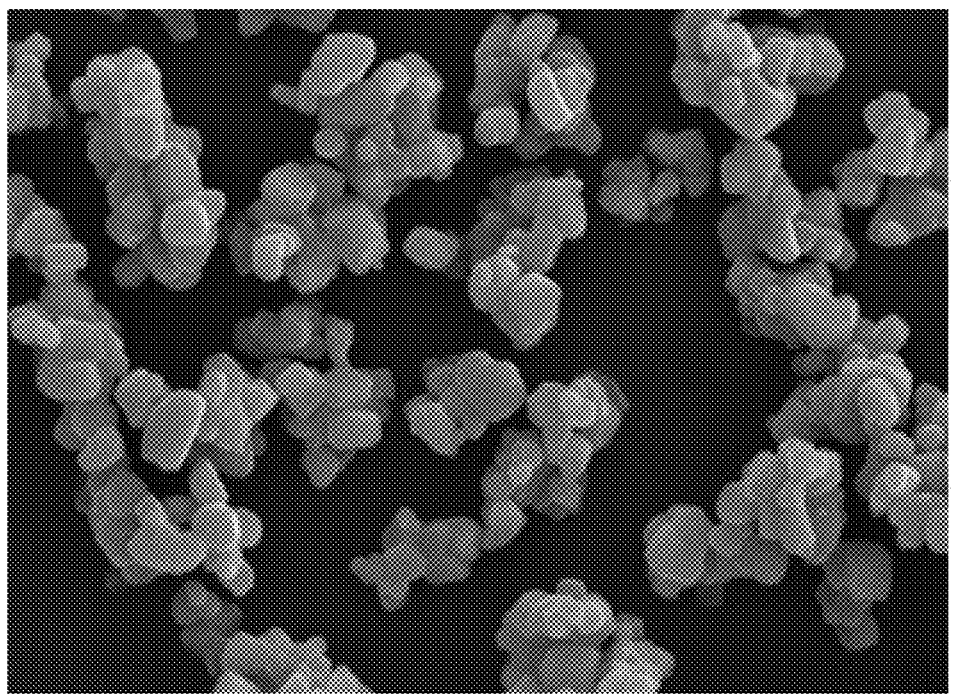
FIG. 5 shows an example of an SEM image of lithium-transition metal composite oxide particles in Comparative Example 1.

As a result, lithium-transition metal composite oxide particles represented by the composition formula: $Li_{1.14}Ni_{0.33}Co_{0.33}Mn_{0.33}O_2$ and having the following properties were obtained: average particle size $^2D_{SEM}$: 1.25 μm, $^2D_{10}$=2.7 μm, $^2D_{50}$=4.5 μm, $^2D_{90}$=6.7 μm, ratio $^2D_{50}/^2D_{SEM}$ of $^2D_{50}$ to average particle size $^2D_{SEM}$ of primary particles: 3.6, ratio $^2D_{90}/^2D_{10}$ in particle size distribution: 2.5, amount of Ni disorder: 1.0%. The physical property values of the obtained lithium-transition metal composite oxide particles are shown in Table 1, and an SEM image thereof is shown in FIG. 5.

Comparative Example 1

Under the same conditions as in Example 1 except that, during the reaction in the crystallization step, a seed slurry prepared in the seed formation step to the reaction tank was added several times, and the timing of the completion of addition of a mixed aqueous solution was changed to the time at which the $D_{50}$ of composite hydroxide particles reached 5.0 a composite oxide having the following properties was obtained: composition ratio Ni/Co/Mn=0.33/0.33/0.33, $^1D_{10}$=2.4 μm, $^1D_{50}$=5.0 μm, $D_{90}$=12.2 μm, $D_{90}/^1D_{10}$=5.1. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1,030° C. for 6 hours to obtain a sintered body. The obtained sintered body was crushed, subjected to a dispersion treatment in a ball mill made of resin for 10 minutes, and then dry-sieved to obtain a powder. The obtained powder and lithium carbonate were mixed so that Li/(Ni+Co+Mn) becomes 1.14 and calcined in air at 900° C. for 10 hours to obtain a sintered body. The obtained sintered body was crushed, subjected to a dispersion treatment in a ball mill made of resin for 10 minutes, and then dry-sieved to obtain a powder.

Figure 6:
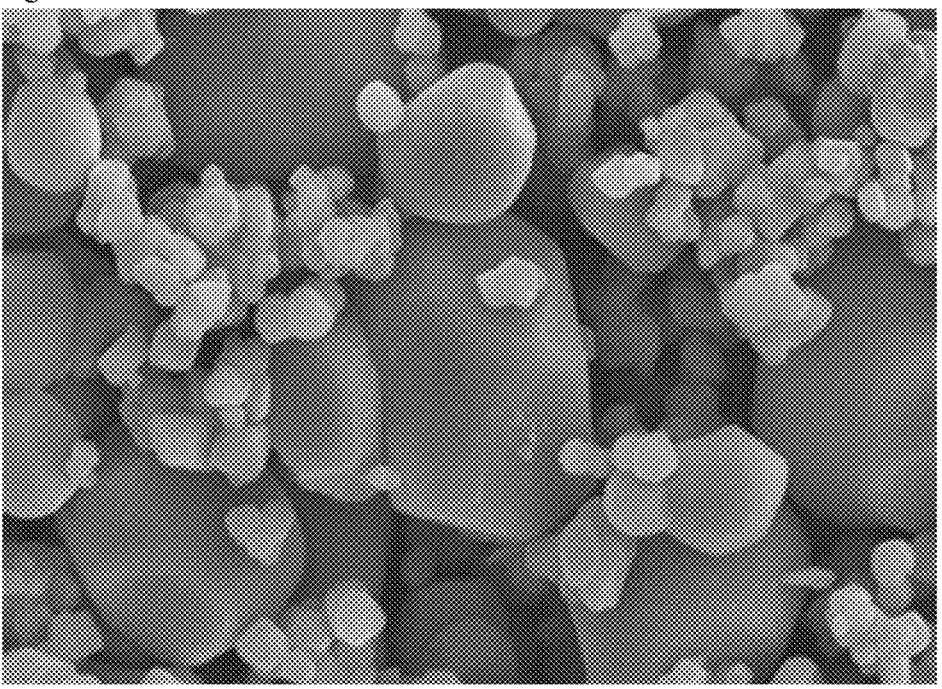
FIG. 6 shows an example of an SEM image of lithium-transition metal composite oxide particles in Comparative Example 2.

As a result, lithium-transition metal composite oxide particles represented by the composition formula: $Li_{1.14}Ni_{0.33}Co_{0.33}Mn_{0.33}O_2$ and having the following properties were obtained: average particle size $^2D_{SEM}$: 3.65 μm, $^2D_{10}$=2.5 μm, $^2D_{50}$=7.0 μm, $^2D_{90}$=13.5 μm, ratio $^2D_{50}/^2D_{SEM}$ of $^2D_{50}$ to average particle size of primary particles: 1.9, ratio $^2D_{90}/^2D_{10}$ in particle size distribution: 5.4, amount of Ni disorder: 0.9%. The physical property values of the obtained lithium-transition metal composite oxide particles are shown in Table 1, and an SEM image thereof is shown in FIG. 6.

Comparative Example 2

First composite oxide particles were obtained under the same conditions as in Example 2. The obtained first composite oxide particles and lithium carbonate were mixed so that Li/(Ni+Co+Mn) becomes 1.15 to obtain a raw material mixture. The obtained raw material mixture was calcined in air at 950° C. for 15 hours to obtain a sintered body. The obtained sintered body was crushed, subjected to a dispersion treatment in a ball mill made of resin for 10 minutes, and then dry-sieved to obtain a powder.

Figure 7:
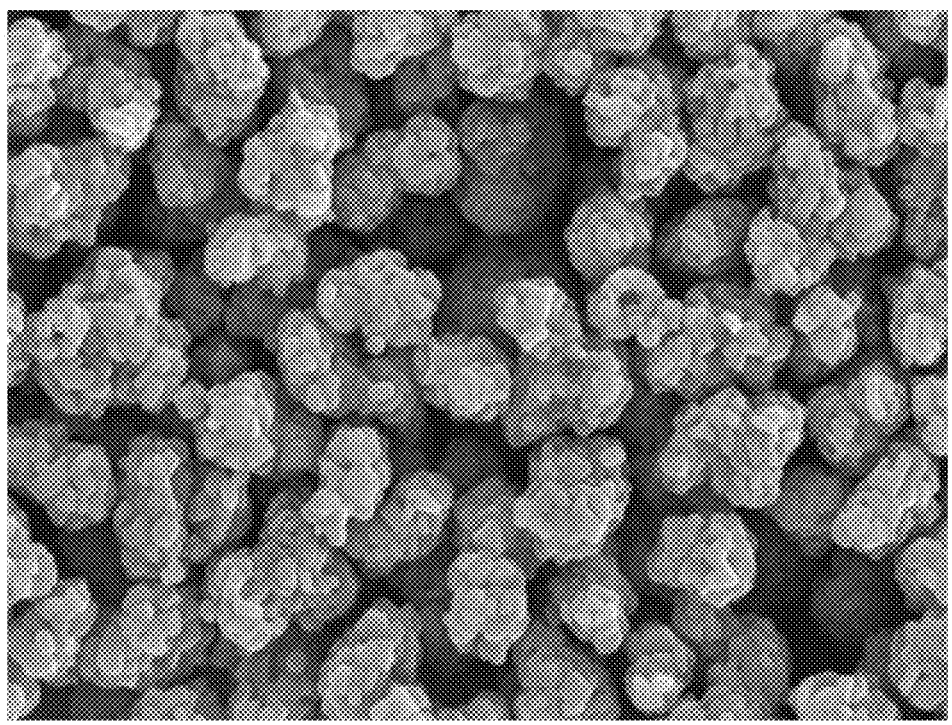
FIG. 7 shows an example of an SEM image of lithium-transition metal composite oxide particles in Comparative Example 3.

As a result, lithium-transition metal composite oxide particles represented by the composition formula: $Li_{1.15}Ni_{0.33}Co_{1.33}Mn_{0.33}O_2$ and having the following properties were obtained: average particle size $^2D_{SEM}$: 0.49 μm, $^2D_{10}$=3.0 μm, $^2D_{50}$=4.4 μm, $^2D_{90}$=7.6 μm, ratio $^2D_{50}/^2D_{SEM}$ of $^2D_{50}$ to average particle size $^2D_{SEM}$: 9.0, ratio $^2D_{90}/^2D_{10}$ in particle size distribution: 2.5, amount of Ni disorder: 0.9%. The physical property values of the obtained lithium-transition metal composite oxide particles are shown in Table 1, and an SEM image thereof is shown in FIG. 7.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and

TABLE 1

| | $^1D_{10}/$ | Compositon | | | | $^2D_{SEM}$ | $^2D_{10}$ | $^2D_{50}$ | $^2D_{90}$ | $^2D_{50}/$ | $^2D_{90}/$ | Amount of Ni |
| --- | --- | --- | --- | --- | --- | --- | --- | --- | --- | --- | --- | --- |
| | $^1D_{90}$ | p | x | y | z | (μm) | (μm) | (μm) | (μm) | $^2D_{SEM}$ | $^2D_{10}$ | disorder (%) |
| Example 1 | 1.8 | 1.15 | 0.33 | 0.33 | 0.33 | 2.8 | 2.9 | 5.0 | 7.9 | 1.8 | 2.7 | 0.6 |
| Example 2 | 1.9 | 1.17 | 0.33 | 0.33 | 0.33 | 1.2 | 1.4 | 3.2 | 5.1 | 2.7 | 3.6 | 1.7 |
| Example 3 | 1.9 | 1.17 | 0.33 | 0.33 | 0.33 | 1.2 | 1.5 | 3.3 | 5.1 | 2.8 | 3.4 | 0.9 |
| Example 4 | 1.9 | 1.17 | 0.33 | 0.33 | 0.33 | 1.4 | 1.1 | 1.9 | 2.8 | 1.4 | 2.5 | 1.0 |
| Example 5 | 1.5 | 1.14 | 0.33 | 0.33 | 0.33 | 6.8 | 7.6 | 10.4 | 16.4 | 1.5 | 2.2 | 1.1 |
| Example 6 | 1.9 | 1.14 | 0.33 | 0.33 | 0.33 | 1.25 | 2.7 | 4.5 | 6.7 | 3.6 | 2.5 | 1.0 |
| Comparative Example 1 | 5.1 | 1.14 | 0.33 | 0.33 | 0.33 | 3.65 | 2.5 | 7.0 | 13.5 | 1.9 | 5.4 | 0.9 |
| Comparative Example 2 | 1.9 | 1.15 | 0.33 | 0.33 | 0.33 | 0.49 | 3.0 | 4.4 | 7.6 | 9.0 | 2.5 | 0.9 |

Lithium-transition metal oxide particles produced by the method of producing described above are a single particle or particles composed of a small number of primary particles, and thus can be efficiently produced without performing another heat treatment after grinding the obtained lithium transition metal oxide to adjust its particle size.

Lithium-transition metal composite oxide particles produced by the production method described above has $^2D_{50}/^2D_{SEM}$ and $^2D_{90}/^2D_{10}$ that are smaller compared with those in Comparative Examples 1 and 2. Accordingly, they are a single particle or are particles composed of a small number of primary particles, and have a uniform particle size. In particular, in Examples 3 and 4, the value of $^2D_{SEM}$ is relatively small, the value of $^2D_{50}/^2D_{SEM}$ is small, the value of $^2D_{90}/^2D_{10}$ is small, and the amount of Ni disorder is small. Therefore, applying such particles to a positive electrode active material of a nonaqueous electrolyte secondary battery allows for providing a nonaqueous electrolyte secondary battery having good output characteristic and durability.

other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may not be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

The invention claimed is:

1. A method of producing a positive electrode active material for a nonaqueous electrolyte secondary battery, comprising:
providing nickel-containing composite oxide particles having a ratio $^1D_{90}/^1D_{10}$ of a 90% particle size $^1D_{90}$ to a 10% particle size $^1D_{10}$ in volume-based cumulative particle size distribution of 3 or less;
mixing the composite oxide particles and a lithium compound to obtain a first mixture;
subjecting the first mixture to a first heat treatment at a first temperature and a second heat treatment at a second temperature higher than the first temperature to obtain a first heat-treated material; and
dissociating from the first heat-treated material the positive electrode active material,
wherein the positive electrode active material comprises lithium-transition metal composite oxide particles having a ratio $^2D_{50}/^2D_{SEM}$ of a 50% particle size $^2D_{50}$ in volume-based cumulative particle size distribution to an average particle size $^2D_{SEM}$ based on electron microscopic observation in a range of 1 to 4,
wherein the lithium-transition metal composite oxide particles have a ratio $^2D_{90}/^2D_{10}$ of a 90% particle size $^2D_{90}$ to a 10% particle size $^2D_{10}$ in volume-based cumulative particle size distribution is 4 or less, and
wherein a molar ratio of nickel in a composition of the lithium-transition metal composite oxide to a total molar number of metals other than lithium is 0.3 to 0.6.

2. The method according to claim 1, wherein the lithium-transition metal composite oxide further contains cobalt and a molar ratio of cobalt in the composition to a total molar number of metals other than lithium is 0.4 or less.

3. The method according to claim 1, wherein the lithium-transition metal composite oxide further contains at least one of Mn or Al and a molar ratio of total molar number of Mn and Al in the composition to a total molar number of metals other than lithium is 0.5 or less.

4. The method according to claim 1, wherein a molar ratio of lithium in the composition to a total molar number of metals other than lithium is 1.0 to 1.3.

5. The method according to claim 1, wherein a molar ratio of oxygen in the composition to a total molar number of metals other than lithium is 1.9 to 2.1.

6. The method according to claim 1, wherein the first temperature is in a range of 850° C. to 950° C., and the second temperature is in a range of 980° C. to 1,100° C.

7. The method according to claim 6, further comprising:
mixing the positive electrode active material dissociated from the first heat-treated material and a lithium compound to obtain a second mixture; and
subjecting the second mixture to a heat treatment to obtain a second heat-treated material.

8. The method according to claim 7, wherein
the composite oxide particles have a 50% particle size $^1D_{50}$ in volume-based cumulative particle size distribution is in a range of 1 μm to 4 μm, and
the lithium-transition metal composite oxide particles are configured such that the 50% particle size $^2D_{50}$ in volume-based cumulative particle size distribution is in a range of 1 μm to 3 μm.

9. The method according to claim 6, wherein
the composite oxide particles have a 50% particle size $^1D_{50}$ in volume-based cumulative particle size distribution is in a range of 1 μm to 4 μm, and
the lithium-transition metal composite oxide particles are configured such that the 50% particle size $^2D_{50}$ in volume-based cumulative particle size distribution is in a range of 1 μm to 3 μm.

10. The method according to claim 1, further comprising:
mixing the positive electrode active material dissociated from the first heat-treated material and a lithium compound to obtain a second mixture; and
subjecting the second mixture to a heat treatment to obtain a second heat-treated material.

11. The method according to claim 10, wherein
the composite oxide particles have a 50% particle size $^1D_{50}$ in volume-based cumulative particle size distribution is in a range 1 μm to 4 μm, and
the lithium-transition metal composite oxide particles are configured such that the 50% particle size $^2D_{50}$ in volume-based cumulative particle size distribution is in a range of 1 μm to 3 μm.

12. The method according to claim 1, wherein
the composite oxide particles have a 50% particle size $^1D_{50}$ in volume-based cumulative particle size distribution is in a range of 1 μm to 4 μm, and
the lithium-transition metal composite oxide particles are configured such that the 50% particle size $^2D_{50}$ in volume-based cumulative particle size distribution is in a range of 1 μm to 3 μm.

13. The method according to claim 1, wherein the ratio $^2D_{50}/^2D_{SEM}$ of the $^2D_{50}$ to the $^2D_{SEM}$ is in a range of 1 to 3.

* * * * *